No. 710,819. Patented Oct. 7, 1902.
E. THIELE.
MANUFACTURE OF FILAMENTS FROM CELLULOSE SOLUTIONS.
(Application filed Apr. 1, 1902.)
(No Model.)
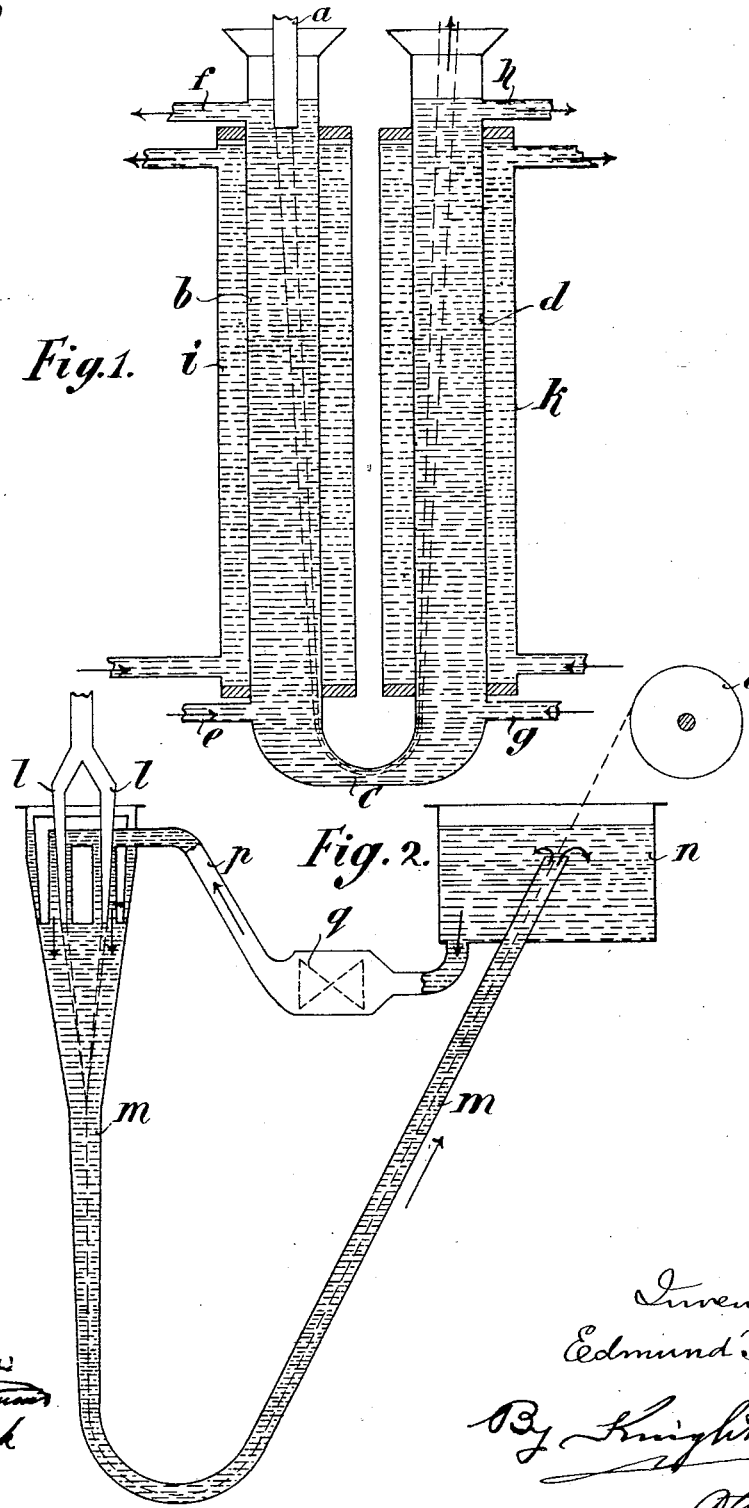

UNITED STATES PATENT OFFICE.

EDMUND THIELE, OF BARMEN, GERMANY.

MANUFACTURE OF FILAMENTS FROM CELLULOSE SOLUTIONS.

SPECIFICATION forming part of Letters Patent No. 710,819, dated October 7, 1902.

Application filed April 1, 1902. Serial No. 100,981. (No specimens.)

*To all whom it may concern:*

Be it known that I, EDMUND THIELE, a subject of the Emperor of Germany, residing at Barmen, Germany, have invented certain new and useful Improvements in the Manufacture of Filaments from Cellulose Solutions, of which the following is a description.

The manufacture of filaments from cellulose solutions has heretofore been effected by causing the solutions to be forced by pressure through capillary tubes into a medium which effects the decomposition of the solution and produces a solidification of the cellulose, such medium being generally a liquid. The diameter of the filament, as also its degree of fineness, is in this case mainly determined by the internal diameter of the discharge-opening. The solidity of the filament produced is mainly dependent upon the content of cellulose in the solutions employed—that is to say, upon the viscousness of the cellulose solution. The relation between the viscousness of the solution and the degree of fineness of the capillary tubes is, however, confined between certain limits, as the internal friction of the cellulose solution in the capillary tubes becomes the greater the more viscous the solution is, whereby the issue of the solution is greatly impeded. On this account the cellulose solution is generally forced through the capillary tubes under a more or less high pressure. For example, Wyss-Naef *Z)eitschrift für angewandte Chemie*, 1899, Seite 32) mentions in his article on the Chardonnet process a pressure of from forty to fifty atmospheres with a capillary opening of 0.08 millimeters. There is a further disadvantage connected with the very small diameters of the capillary tubes for the production of fine filaments. The cellulose must be very carefully filtered before being forced through the tubes, which in the case of viscous solutions can only be effected by very high pressure; but even then the clogging of the very fine discharge-openings frequently takes place, and although the capillary tubes can be readily changed there will always be caused a loss of material and of time. These disadvantages have been partially obviated in the employment of nitrocellulose (collodion) for the production of silk-like filaments by Lehner, who effects the formation of the filament in such manner that a comparatively thick filament issuing from a not very fine opening, such as one-fourth or one-eighth millimeter, is reduced to a fine condition by drawing it out to a greater or less extent. Such a process has, however, not heretofore been employed with the aqueous solutions of cellulose—such as ammoniacal copper-oxid solution, chlorid-of-zinc solution, viscose solution—the particular value of which for the manufacture of silk-like filaments has been recently acknowledged. This is easily explained. The formation of the filament from the nitrocellulose solutions is effected by the removal of the solvent, and therefore quite gradually. With the aqueous solutions of cellulose the solution is, on the other hand, decomposed, the cellulose being at once separated in a solid form. It is still more or less elastic; but it cannot be permanently altered in its form. It could, therefore, not be expected to be able to produce the filaments from cellulose, as in the case of nitrocellulose, by drawing out thicker filaments.

I have made the important discovery that strongly-concentrated cellulose solutions have in the above respect special properties. These solutions contain such quantities of cellulose and have such a consistency that by simply drawing out the mass in the open air solid filaments are at once produced. The formation of the filaments is due to the fact that from a thin layer of the concentrated solution the air takes away so much water or ammonia that a superficial solidification of the solution is effected; but the formation of the filaments is not effected in the desired uniform manner. Better results are obtained if the cellulose solution is caused to issue through capillary tubes of about one-half millimeter diameter into warm air heated by steam or otherwise; but the production of the filaments by drawing out the concentrated cellulose solutions is best effected if the solution is caused to flow through comparatively large openings, such as one-half to one-fifth millimeter diameter, into certain liquids which slowly separate or precipitate the cellulose. For cellulose solutions rich in ammonia, for example, it has been proved to be advantageous for this purpose to use heated water and volatile liquids—such as acetic ether and other ethers, benzol, chloroform, carbon tetrachlorid, and similar liquids—which are not entirely insoluble in water. Such liquids which have not of themselves a precipitating action can be employed with the addition of other substances for drawing out the cellulose solutions—such, for instance, as oils and fats, with the addition of olein; ligroin, with addition of ether, alcohol, and similar substances; water, with the addition of alcohol, ether, glycerin, salts, and acids.

With concentrated cellulose solutions that are poor in ammonia some of the liquids named—such as, for instance, warm water and dilute acids—still have a too strongly precipitating property and may therefore give rise to a fracture of the filaments when these are being drawn out rapidly. In such cases it is of advantage to use as a slowly-precipitating liquid pure cold water of from 10° to 20° centigrade, and if this should still act too rapidly with the addition of a small quantity of alkali in particular ammonia, whereby the removal of ammonia and copper, which effects the precipitation of the cellulose, will be retarded, and the greater liquidity of the concentrated cellulose solution will be prevented which occurs at higher temperatures. At the same time these precipitants enable a saving of ammonia to be effected and also the repeated use of the precipitating liquid, which gradually becomes richer in ammonia. The number of the available precipitants is, however, by no means exhausted by the above examples. It is a necessary condition for the utility of the said precipitants that they shall act with a slowly-precipitating action upon the concentrated cellulose solutions, and consequently produce the formation of the solid filament only after a certain duration of the precipitating action. Thus liquids, such as strong acid solutions, which at once effect the decomposition of the cellulose solutions with separation of the cellulose or which effect the immediate coagulation of the cellulose solutions are not useful for the process in question. Also those liquids which do not take up either water or ammonia from the cellulose solutions cannot be used for the drawing out of the filaments.

The drawing out of the filaments in the slowly-acting precipitating medium can be effected by any suitable mechanical device—such, for instance, as a rapidly-revolving roller. Gravity may, however, also be utilized for drawing out the filaments within the slowly-acting precipitating medium—namely, while on one hand the filaments rapidly lose their contents of metal, such as copper and zinc, when subjected to a rapidly-acting precipitating medium and then on account of the low specific gravity of the cellulose sink only slowly in the liquid, on the other hand when using a slowly-acting precipitating medium the filaments rich in metals, and consequently of high specific gravity, will exercise a strong downward pull, and therefore if the height through which they descend is sufficient they will produce a reduction of the section of the higher part of the filament in drawing it out. This mode of operating constitutes not only a considerable simplification of the process, as special drawing-out devices are entirely dispensed with, but it also produces a very uniform filament, as the gravity of the filament under normal working will constitute an exceedingly uniform drawing-out power and will not cause a fracture of the filament in the case of any disturbance occurring, as would be the case if an independent mechanical stretching device were employed.

The height through which the filament should descend in the slowly-acting precipitating medium will depend upon the degree of the action of the latter, upon the diameter of the discharge-opening, upon the concentration of the cellulose solution, and the desired fineness of filament. The drawing out of the filament in the slowly-precipitating medium can be aided by imparting to the precipitating liquid a considerable motion in the direction of the issue of the filament, so as to cause it to draw the formed filament along with it.

In practically carrying out the process it is of advantage to cause the slowly-acting and rapidly-acting precipitating liquids to operate in superposed layers upon the filament or arrange them in communicating receptacles in such manner that the issuing filament first passes through the slowly-acting precipitant, where it is drawn out, and is then caused to pass through the rapidly-acting precipitant for the purpose of completing the requisite decomposition without being subject to further manipulations while in a very sensitive condition of its incomplete decomposition.

If several discharge-openings are placed closely side by side, the drawn-out filaments will on issuing from the bath unite on account of their attraction of cohesion for forming thicker bundles of filaments that can be more readily manipulated, but that will not stick together, such uniting of the filaments being effected without requiring special means for the purpose, as is requisite in the known processes. In this case should one of the filaments break the fractured part will be carried along by adhesion to the other filaments without causing any interruption of the operation.

I will now describe, by way of example, various modes of practically carrying my said invention into effect.

1. For the cellulose solution is taken a highly-concentrated ammoniacal copper-oxid solution of cellulose, which is forced without material pressure from a raised reservoir through several discharge-openings in the side wall of a tank. The discharge-orifices have a diameter of from one-half to one-fifth millimeter and may be of any desired configuration; but the surface surrounding the orifice should be as small as practicable in order to prevent the adhesion of the cellulose solution as far as possible. Thus thick glass tubes should be avoided. The tank, which is about one meter long, contains ether as the precipitating liquid. The drops of the cellulose solution hanging from the orifices of the tubes are simultaneously seized by a holding device and are led to a glass roller revolving in sulfuric acid outside the tank. The several filaments issuing from the precipitating liquids in a moist condition adhere to each other, so that no special means are required for leading them together in order to unite them. It is, however, of advantage to provide a suitable movable guide either inside or outside the tank for leading the formed thread laterally to and fro over the roller.

2. The cellulose solution is worked in the same way as at Example 1; but the discharge-orifices are so arranged as to be situated in a recess in the bottom of the precipitating-tank. By this means it is rendered possible to maintain the precipitating liquid surrounding the discharge-openings at a lower temperature than that of the liquid in the other parts of the tank. Water is in this case used as the precipitating liquid, the temperature of the lower strata being maintained at from 40° to 50° centigrade and that of the upper strata at from 95° to 100°. The filament is otherwise treated as above described.

3. The precipitating-tank referred to in Example 2 is employed and the temperature of the water is maintained, respectively, at from 35° to 40° and at from 50° to 55°. The hotter upper stratum of water is covered with a layer of olein about one centimeter thick, which acts upon the completely drawn-out thread like an acid and effects also the removal of all solid impurities that may float in the water, such as copper hydroxid, which is taken up by the layer of olein. The winding up of the filament is effected in the manner above described upon a roller revolving in sulfuric acid. The issue of the cellulose solution and the drawing out thereof are effected in the above-mentioned liquids in an exceedingly-uniform manner. As soon as the ratios between the speed of rotation of the roller and that of the issue of the cellulose solution is suitably adjusted no breaking of the filament will occur. The filament is drawn out to a degree of fineness quite equal to that of natural silk, thus greatly increasing its valuable property as regards elasticity, and consequently its usefulness for the production of woven fabrics. It is certainly not possible to produce filaments of equal fineness by means of the methods heretofore employed of ejecting the cellulose solution through fine orifices into liquids that immediately solidify the filaments. A further essential advantage consists in the convenient mode of forming the discharge-orifices, the prevention of any choking thereof, and also of any breaking of the thread. This improved method of manufacture also allows of an exceedingly-rapid rate of production. The speed of formation of the filament is only limited by the degree of adhesion of the filament to the surface of the precipitating liquid. All these advantages, which occur in the same way when forming filaments of all concentrated cellulose solutions, afford the improved process a considerable practical value. The drawing out of the filaments in the slowly-acting precipitating liquid by the agency of their own gravity can be effected by means of apparatus such as shown, by way of example, on the accompanying drawings.

4. In Figure 1 numerous filaments issue from the perforated rose-like end of the tube $a$ and are considerably extended by their own gravity in passing down through the tube $b$, filled with slowly-acting precipitating liquid. They are then led through the narrow connecting-passage $c$ into the tube $d$, which is filled with rapidly-acting precipitating liquid, and after leaving $d$ they are wound up in the usual way, scoured, and washed. The passage of the filaments is indicated by dotted lines on the drawings. The tubes $b$ and $d$ are provided with supply and discharge pipes $e f g h$ for discharging the precipitating liquids when they have been rendered inefficient after long use and replacing them with fresh liquids. For enabling the tubes $b d$ to be cooled or heated, as may be required, they are surrounded by jackets $i k$, through which a cooling or heating fluid is made to circulate.

5. In the arrangement at Fig. 2 the filaments issue from the tubes $l l$ and pass through the vessel $m$, filled with slowly-acting precipitating liquid, into the vessel $n$, filled with the same liquid, and are wound up on the roller $o$, and while on this they are successively treated with the rapidly-acting precipitating liquid, with acid, and with water. For stretching the issuing filaments in the tube $m$ there is provided between the tube $m$ and tank $n$ a fluid-motor $q$, operating as a propeller, which drives the liquid energetically in the direction of the issue of the filaments through the tube $m$, and thereby draws out the comparatively thick filaments to any desired degree of fineness.

Having thus described my invention, the following is what I claim as new therein and desire to secure by Letters Patent:

1. The process for the manufacture of filaments from cellulose solutions wherein an aqueous cellulose solution issues through comparatively large orifices into a precipitating medium that acts only slowly upon the aqueous cellulose solution, said issuing solution being drawn out to fine filaments in such medium, substantially as described.

2. Process for the manufacture of filaments from cellulose solutions wherein the cellulose solution issues through comparatively large orifices into a precipitating medium that acts only slowly upon the cellulose solution, said issuing solution being drawn out into fine filaments in such medium by the action of its own gravity, substantially as described.

3. Process for the manufacture of filaments from cellulose solutions wherein the cellulose solution issues through comparatively large orifices into a precipitating medium that acts only slowly upon the cellulose solution, said issuing solution being drawn out to fine filaments in such medium, after which it is subjected to the action of a more rapidly acting precipitating medium, both media touching each other in such manner that the filament can pass from the slowly-acting precipitant directly into the rapidly-acting precipitant, substantially as described.

4. Process for the manufacture of filaments from cellulose solutions wherein the cellulose solution issues through comparatively large orifices into a liquid-precipitating medium that acts only slowly upon the cellulose solution, said issuing solution being drawn out to fine filaments in such medium, after which it is subject to the action of a more rapidly acting precipitating medium which either forms a stratum below the slowly-acting medium, or is contained in a receptacle communicating with the latter, substantially as described.

5. Process for the manufacture of filaments from cellulose solutions wherein the cellulose solution issues through comparatively large orifices into a liquid-precipitating medium that acts only slowly upon the cellulose solution, said issuing solution being drawn out to fine filaments in such medium, such drawing out being effected by imparting a rapid motion to the precipitating liquid in the direction of issue of the filaments, substantially as described.

6. Process for the manufacture of filaments from cellulose solutions wherein the cellulose solution issues through comparatively large orifices into a precipitating medium that acts only slowly upon the cellulose solution, said issuing solution being drawn out into fine filaments in such medium by the action of its own gravity, such drawing out being aided by imparting a rapid motion to the precipitating liquid in the direction of issue of the filaments, substantially as described.

EDMUND THIELE.

Witnesses:
OTTO KÖNIG,
J. A. RITTERSHAUS.